United States Patent
Sigg

[11] 3,960,253
[45] June 1, 1976

[54] POSITIVE ENGAGEMENT CLUTCH

[75] Inventor: Hans Sigg, Mutschellen, Switzerland

[73] Assignee: Maag Gear-Wheel & Machine Company Limited, Zurich, Switzerland

[22] Filed: Feb. 28, 1974

[21] Appl. No.: 447,018

[30] Foreign Application Priority Data
Mar. 2, 1973 Switzerland.......................... 3080/73

[52] U.S. Cl............................ 192/67 A; 192/48.1; 192/46; 192/34
[51] Int. Cl.² .................... F16D 13/22; F16D 43/00
[58] Field of Search................ 192/46, 67 R, 48.91, 192/34, 67 A, 54, 48.1, 35

[56] References Cited
UNITED STATES PATENTS

| | | | |
|---|---|---|---|
| 1,752,937 | 4/1930 | Barnett | 192/46 X |
| 2,068,869 | 1/1937 | Rauen | 192/46 X |
| 2,556,678 | 6/1951 | Crafts | 192/67 R X |
| 3,154,181 | 10/1964 | Sigg | 192/46 X |
| 3,306,409 | 2/1967 | Giometti | 192/46 X |
| 3,425,527 | 2/1969 | Wolf | 192/67 R X |
| 3,498,151 | 3/1970 | King | 192/46 X |
| 3,563,354 | 2/1971 | Sigg | 192/46 X |
| 3,589,488 | 6/1971 | Clements | 192/67 A |
| 3,743,067 | 7/1973 | Bokovoy | 192/46 X |

FOREIGN PATENTS OR APPLICATIONS

| | | | |
|---|---|---|---|
| 647,475 | 8/1962 | Canada | 192/54 |

Primary Examiner—Samuel Scott
Assistant Examiner—Lance W. Chandler
Attorney, Agent, or Firm—Toren, McGeady and Stanger

[57] ABSTRACT

A heavy duty dog clutch has co-axial driving and driven shaft elements each with a toothed connection to an intermediate sleeve that is axially displaceable to make and release one of said connections. The toothing of the releasable connection is helically formed so that a given direction of driving torque tends to screw together the helical toothing. One of the shaft elements is capable of axial displacement by the reaction to said torque in the helical toothing and this causes a pair of abutment surfaces on the shaft elements to bear against each other to engage the clutch fully.

9 Claims, 3 Drawing Figures

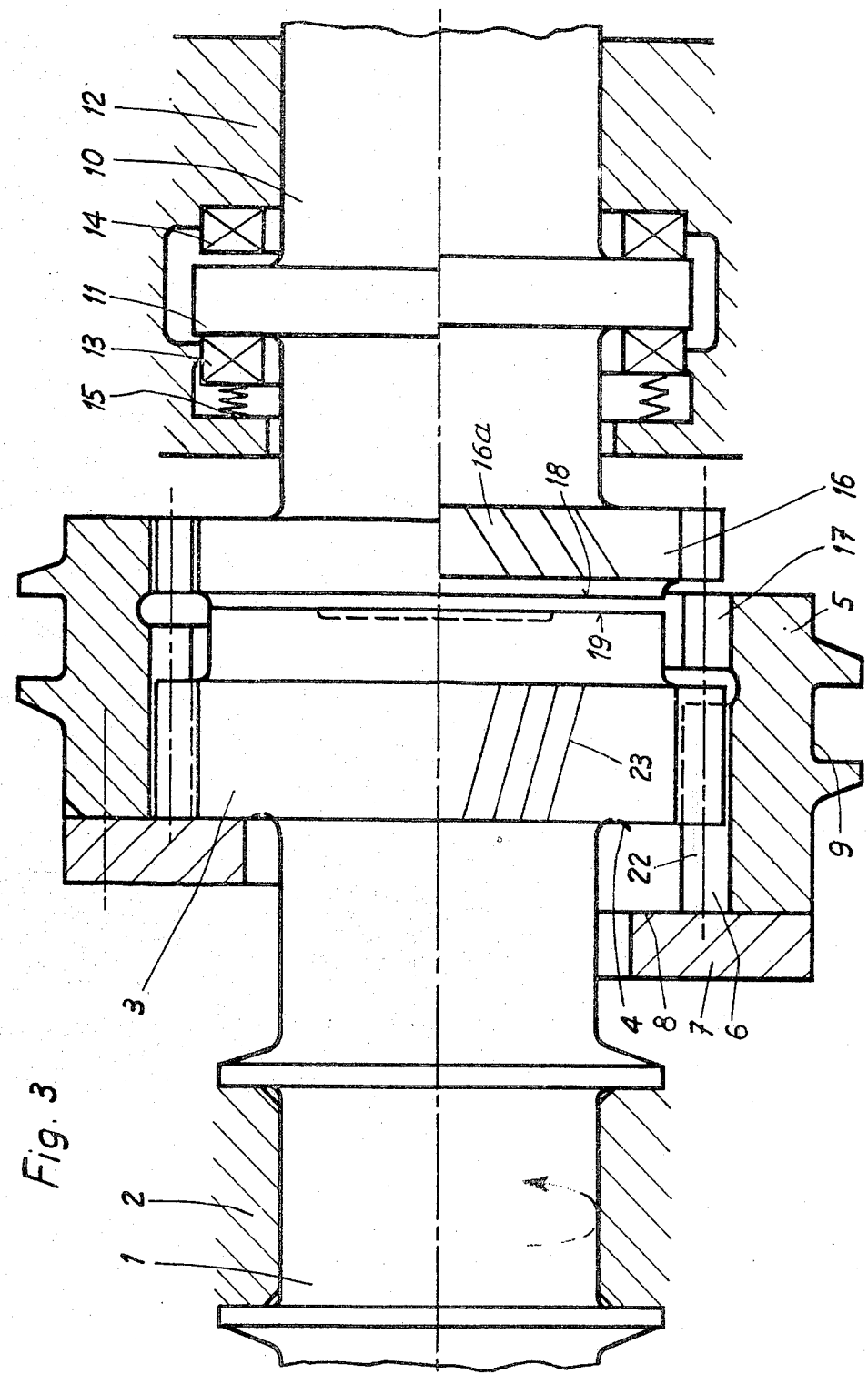

POSITIVE ENGAGEMENT CLUTCH

BACKGROUND OF THE INVENTION

The invention relates to an engageable and disengageable coupling or clutch for engaging and disengaging a drive between shafts using an intermediate member to interconnect and disconnect co-axial driving and driven shaft elements.

U.S. Pat. No. 3,709,343 (as one example) discloses a toothed or dog clutch of this type, in which two toothed rims are arranged on one side of the clutch for facilitating engagement of the latter, these toothed rims being offset from one another by less than half the tooth pitch. However, this clutch does not provide a very compact assembly and has limitations in the robustness of the connection it provides between the driving and driven shafts.

Thus, there can be problems in providing a clutch which enables very large power units to be coupled and uncoupled, e.g., units providing powers of a greater order of magnitude than 100 MW, and speeds of perhaps 3000 r.p.m., where the clutch is to be capable of connecting together the two shaft ends such that deformations will be precluded in a relatively resilient shaft system. By reason of the high powers and of the relatively high speeds indicated, it is not feasible to use, for example, any types of clutch which comprise eccentric parts. Also, it is not possible to use a clutch of a known type of construction, which has simply been given greater dimensions to enable it to transmit such a power. What is required is a clutch which, in its engaged condition and under load, secures together the shaft ends of for example a generator and turbine as securely as a flanged connection, although providing also the facility of disengagement.

SUMMARY OF THE INVENTION

According to the invention, there is provided a positive engagement clutch comprising co-axial first and second shaft elements and an intermediate member displaceable axially of said elements to connect and disconnect them, the intermediate member being provided with first and second series of teeth or splines, the first series being maintained in engagement with teeth of the first shaft element and the second series of teeth being engageable and disengageable with teeth of said second shaft element with the displacement of the member, respective elements of a first pair of co-operating abutment elements on or fixed to said member and said first shaft element to limit movement of the intermediate member relative to said shaft element and the second series of teeth of the intermediate member being of helical formation such that, dependent upon the torque applied to the clutch with the member engaging the teeth of second element, an axial force is generated by said torque to act between said helical series of teeth and the engaged teeth of said second element to urge them further into engagement, a second pair of co-operating abutment elements between the shaft elements being brought into engagement by a relative displacement of the shaft elements caused by said axial force to fully engage the clutch.

BRIEF DESCRIPTION OF THE DRAWINGS

Different embodiments of the invention are diagrammatically illustrated in FIGS. 1 to 3 respectively of the accompanying drawings, each figure being an axial section with the upper half showing the clutch in the engaged condition and the lower half showing the clutch in the disengaged condition.

FIG. 3 illustrates a clutch with helical toothing between both the driving and driven shaft elements and their interconnecting sleeve.

DESCRIPTION OF THE PREFERRED EMBODIMENTS

Figure 1:
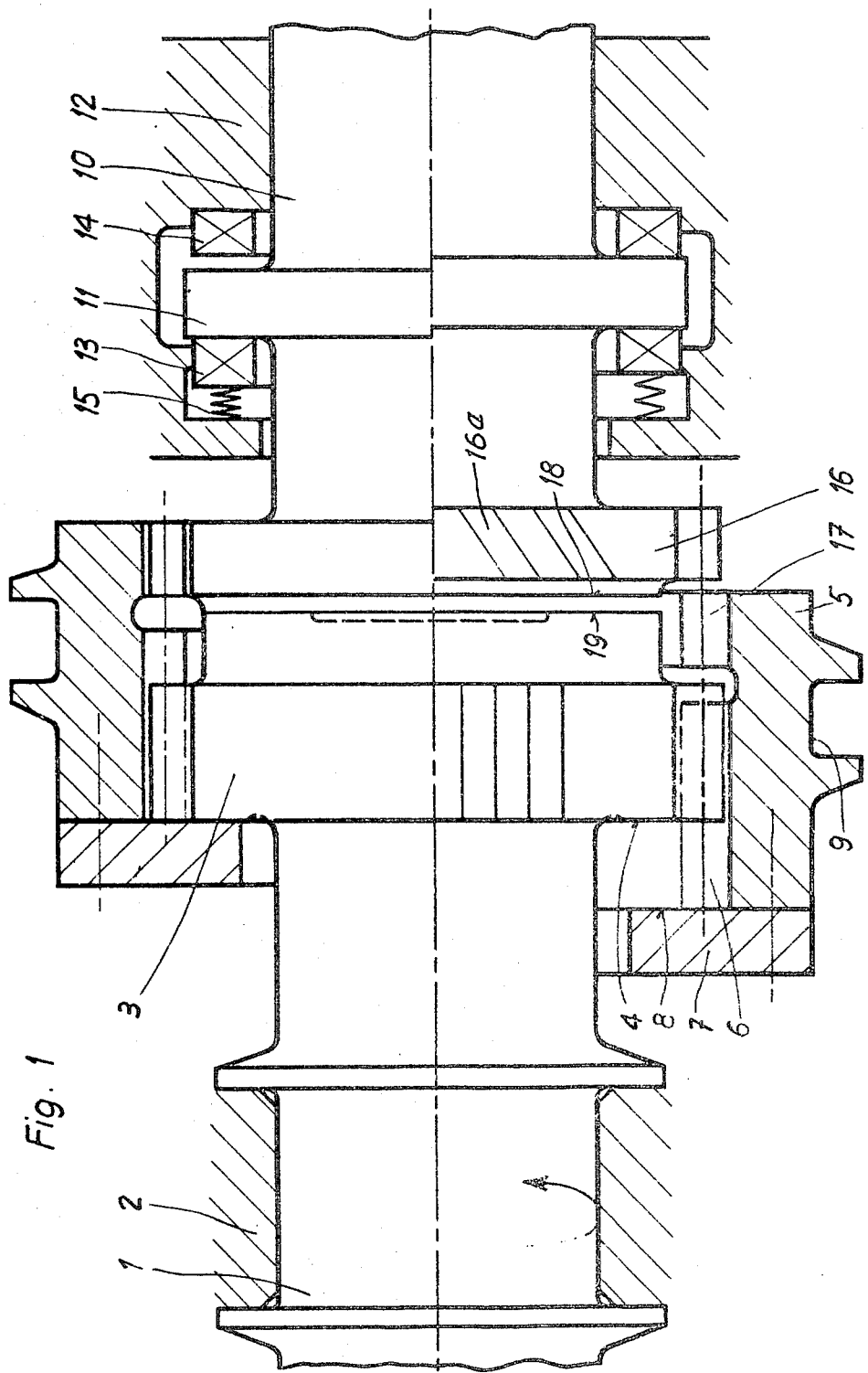
FIG. 1 illustrates a first embodiment of clutch according to the invention.

In the embodiment of FIG. 1, an externally toothed wheel 3, with straight, axially directed teeth or splines is fixed to a drive shaft 1, mounted in a radial and axial bearing 2. The toothed wheel 3 may be regarded as a first or driving shaft element of the clutch. A coupling sleeve 5 of the clutch has an internal ring of splines or teeth 6, which engage the splines or teeth of the wheel 3. A flange 7 rigidly secured to the coupling sleeve 5 comprises an end surface 8 that can be brought into abutment with a rear end surface 4 of the wheel 3 to limit the movement of the sleeve 5 axially of the wheel. The coupling sleeve 5 is formed with a peripheral groove 9 for an operating fork or bridle (not shown) of conventional form by means of which it is axially displaced.

A driven shaft 10 is arranged coaxially of the drive shaft 1 and is radially supported by a bearing 12. The shaft has a flange 11 co-operating with two bearings 13 and 14 that serve for axial support of the shaft in a manner permitting some axial movement, a compression spring or springs 15 acting on the axial bearing 13 urges it and the shaft 10 to the right as seen in the figure, that is to say away from the drive shaft 1. A second wheel 16, having helical splines or toothing 16a, is secured to the driven shaft 10 and can mesh with complementary internal toothing 17 on the coupling sleeve 5. The wheel 16 has a planar end face 18 which, together with a planar end face 19 on the toothed wheel 3, forms a second pair of abutment surfaces limiting axial movement of the sleeve. The respective wheels 3, 16 can be regarded as forming or being parts of driving and driven shaft elements of the clutch.

To describe the operation of the clutch in FIG. 1, let it first be assumed that driving and driven shafts 1 and 10 are stationary, and that the clutch is disengaged (lower half of FIG. 1). To couple the shafts, the drive shaft 1 is first rotated slowly (anticlockwise as seen from the left of the figure) and at the same time the coupling sleeve 5 is displaced towards the right to bring the helical toothing 17 into engagement with the toothing 16a of the wheel 16. Because of the torque applied by the drive shaft 1 and the direction of obliquity of the helical toothing, the sleeve and driven shaft will tend to screw into each other.

This action urges the driven shaft leftwards against the bias of the spring 15 and displaces the sleeve rightwards to bring the first pair of abutment surfaces 4, 8 into engagement. At the instant when the abutment surface 8 of the sleeve 5 strikes against the abutment surface 4 of the wheel 3, due to the effect of the torque of the drive shaft 1, the wheel 16 moves sufficiently against the bias of the spring 15 to bring its abutment surface 18 against the abutment surface 19 of the wheel 3.

The two toothed wheels 3 and 16 will then be securely connected together, and the driving and driven shafts 1 and 10 will then be locked in rotation with one another (upper half of FIG. 1).

If the torque in the clutch reverses, the clutch will be immediately disengaged owing to the helical teeth 16a, 17 running out of mesh, the coupling sleeve 5 moving leftwards as seen in the drawing and, because of the axial biasing force or pressure of the compression spring 15, the driven shaft 10 moving rightwards. The abutment surfaces 18 and 19 move apart from each other, and with disengagement of the clutch, therefore, there are no parts in frictional contact with one another. Disengagement of the clutch can also take place, by displacing the coupling sleeve 5 to the left, when the various components are stationary.

As a modification of the illustrated arrangement, the compression spring or springs 15 may be arranged, for example, between the two shafts 1 and 10, and it will also be possible to replace the spring 15 by a hydraulic or pneumatic piston which axially loads one element of the parts which are to be coupled together, so as to completely disengage the clutch when the driving torque is discontinued.

Figure 2:
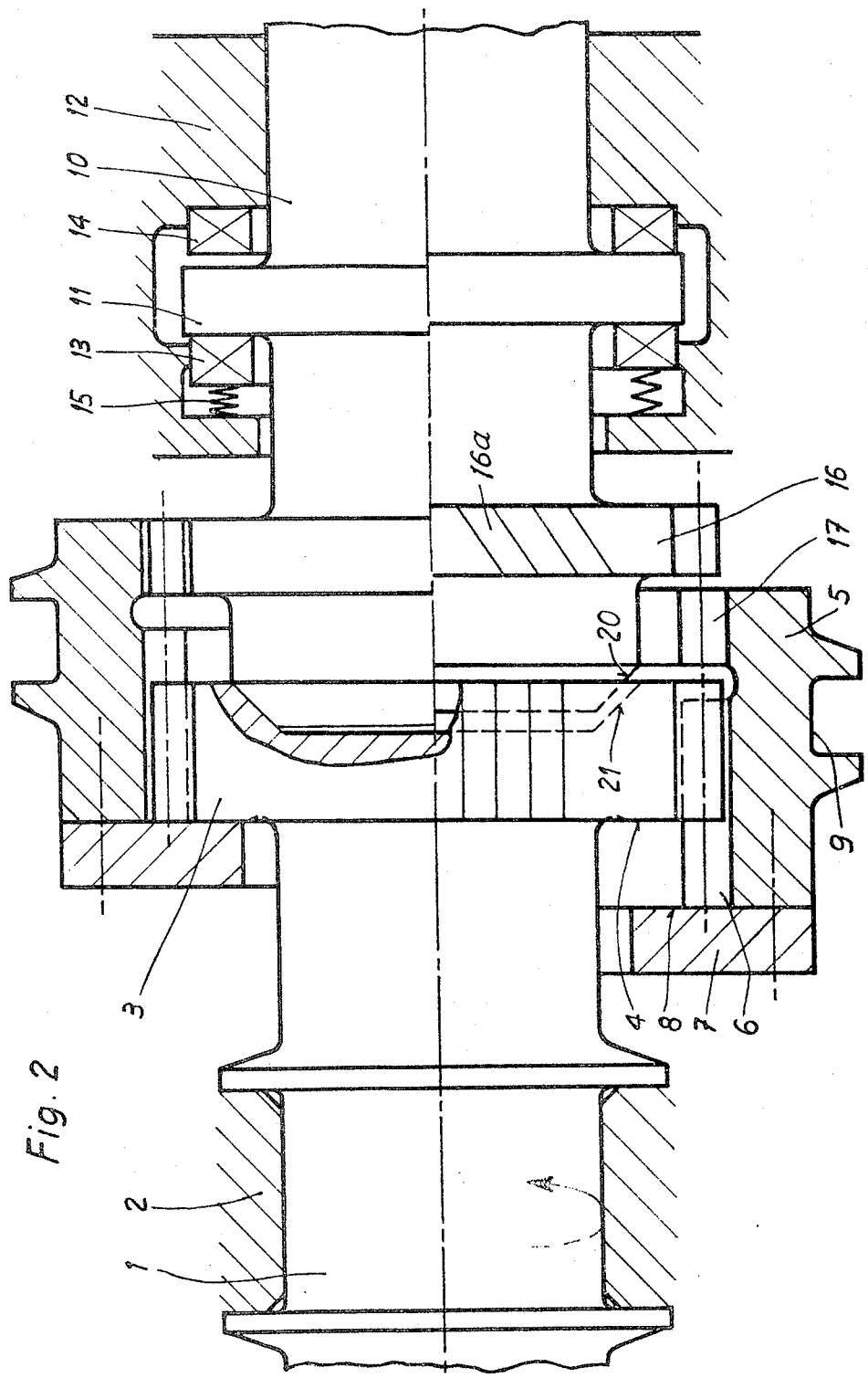
FIG. 2 illustrates an embodiment with the driving and driven shaft elements having abutment surfaces of tapered shape.

FIG. 2 illustrates a modified form of clutch according to the invention in which the second pair of abutment surfaces 20 and 21 between the shaft elements are of axially tapered form, in contrast to the arrangement in FIG. 1, in which the second pair of abutment surfaces 18 and 19 have planar faces. The alternative shown in FIG. 2 affords the advantage that, if the driving and the driven shafts 1 and 10 are not strictly coaxial, they will be centered with each other as engagement of the clutch takes place.

FIG. 3 shows a further modified form of clutch according to the invention wherein the straight or axial toothing of the wheel 3 and its meshing internal ring 6 of FIG. 1 is replaced by helical toothing 22 and 23, shown with a spiral pitch opposite to that of the toothing 16a, 17. This affords the advantage that the pressure exerted between the first pair of abutment surfaces can be increased or reduced by appropriately selecting the helic angles of the sets of teeth 22 and 23.

The clutches described above can easily be engaged and disengaged. In the disengaged condition the shafts are completely separated from one another but in its engaged condition each clutch has similar characteristics to those of a rigid flanged connection, in that the clutch is not subject to wear. Because, in the engaged condition of the clutch, no relative movements will take place (even when the shaft ends are not in exact alignment) in the co-operating sets of teeth of the clutch, the teeth may be subjected to very much higher specific loads than is possible with parts which are not securely pressed against each other. Again, this makes it possible to construct such clutches for very high powers, such as have not hitherto been found possible to deal with using conventional toothed or dog clutches.

It will be understood that while the illustrated examples show clutches with driving and driven toothed wheels interconnected by an internally toothed sleeve, an equivalent arrangement can be provided using internally toothed driving and driven shaft elements with externally toothed interconnecting means. Also, the invention is applicable both to manually controlled clutches and also to synchromesh clutches.

What I claim and desire to secure by Letters Patent is:

1. A positive engagement clutch comprising co-axial first and second shafts displaceable axially relative to each other and an intermediate member displaceable axially of said shafts to connect and disconnect them, first and second series of teeth on the intermediate member, teeth on the first shaft maintained in engagement with said first series of teeth of the intermediate member, teeth on the second shaft being engageable and disengageable with said second series of teeth of the intermediate member as a result of said axial displacement of the member to drivingly connect and disconnect the first and second shafts, respective elements of a first pair of co-operating abutment elements on said intermediate member and said first shaft to limit movement of said intermediate member relative to said first shaft, said second series of teeth of the intermediate member being of helical formation such that, dependent upon the torque applied to said clutch with said second series of tetth of said intermediate member engaging the teeth of said second shaft, an axial force is generated by said torque to act between said helical series of teeth and the engaged teeth of said second shaft to urge them further into engagement, a second pair of co-operating abutment elements between the shafts being brought into engagement by a relative displacement of the shafts caused by said axial force to lock the shafts together against said axial force.

2. A clutch according to claim 1 wherein end faces of the shaft elements constitute said second pair of abutment elements.

3. A clutch according to claim 2 wherein said end faces are of planar form.

4. A clutch according to claim 2 wherein said end faces are of axially tapered form.

5. A clutch according to claim 1 wherein the first series of teeth of the displaceable member and the co-operating teeth of the first shaft element are axially directed.

6. A clutch according to claim 1 wherein the first series of teeth of the displacement member and the co-operating teeth of the first shaft element are of helical form.

7. A clutch according to claim 1 further comprising biasing means acting in the axial direction to disconnect said second shaft element teeth and said second series of teeth of the intermediate member, whereby to cause the clutch to move towards a position of disengagement in the absence of a driving torque urging said second pair of abutment elements towards each other.

8. A clutch according to claim 1 wherein the displaceable member is in the form of a sleeve having said series of teeth formed as internal gear rings.

9. A clutch according to claim 1 wherein said second pair of abutment elements have respective engagement faces coincident with geometrical surfaces of revolution concentric with the axis of rotation of their shaft elements.

* * * * *